US009749638B1

(12) United States Patent
Jia

(10) Patent No.: US 9,749,638 B1
(45) Date of Patent: Aug. 29, 2017

(54) METHOD AND APPARATUS FOR ENCODING VIDEO WITH DYNAMIC QUALITY IMPROVEMENT

(75) Inventor: Wei Jia, San Jose, CA (US)

(73) Assignee: GOOGLE INC., Mountain View, CA (US)

(*) Notice: Subject to any disclaimer, the term of this patent is extended or adjusted under 35 U.S.C. 154(b) by 799 days.

(21) Appl. No.: 13/095,971

(22) Filed: Apr. 28, 2011

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/147 | (2014.01) |
| H04N 19/164 | (2014.01) |
| H04N 19/136 | (2014.01) |
| H04N 19/154 | (2014.01) |

(52) U.S. Cl.
CPC ......... *H04N 19/147* (2014.11); *H04N 19/136* (2014.11); *H04N 19/154* (2014.11); *H04N 19/164* (2014.11)

(58) Field of Classification Search
CPC ....... H04N 19/00472; H04N 19/00781; H04N 19/00157; H04N 19/00266; H04N 19/00278; H04N 19/002; H04N 19/00193; H04N 19/00187; H04N 19/00181
USPC ........................................ 375/240.02, 240.25
See application file for complete search history.

(56) References Cited

U.S. PATENT DOCUMENTS

| | | |
|---|---|---|
| 4,924,310 A | 5/1990 | von Brandt |
| 5,148,269 A | 9/1992 | de Haan et al. |
| 5,337,086 A | 8/1994 | Fujinami |
| 5,398,068 A | 3/1995 | Liu et al. |
| 5,512,952 A | 4/1996 | Iwamura |
| 5,731,840 A | 3/1998 | Kikuchi et al. |
| 5,886,742 A | 3/1999 | Hibi et al. |
| 5,916,449 A | 6/1999 | Ellwart et al. |
| 5,930,387 A | 7/1999 | Chan et al. |
| 5,991,447 A | 11/1999 | Eifrig et al. |
| 6,005,625 A | 12/1999 | Yokoyama |
| 6,005,980 A | 12/1999 | Eifrig et al. |
| 6,021,213 A | 2/2000 | Helterbrand et al. |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Frederick Bailey
*Assistant Examiner* — Farhan Mahmud
(74) *Attorney, Agent, or Firm* — Young Basile Hanlon & MacFarlane, P.C.

(57) ABSTRACT

A system and method for encoding a video signal having a sequence of frames including a reference frame and a current frame is disclosed. The method includes encoding at a least a portion of the reference frame using a low-quality encoding scheme and encoding the current frame using the reference frame so that the encoded current frame includes at least one pixel encoded using the low-quality encoding scheme. The method also includes identifying a portion of the encoded current frame that includes at least one pixel encoded using the low-quality encoding scheme. The method also includes encoding the identified portion of the current frame using a high-quality encoding scheme.

19 Claims, 7 Drawing Sheets

(56) References Cited

U.S. PATENT DOCUMENTS

| | | | |
|---|---|---|---|
| 6,044,166 A | 3/2000 | Bassman et al. | |
| 6,058,211 A | 5/2000 | Bormans et al. | |
| 6,195,391 B1 | 2/2001 | Hancock et al. | |
| 6,272,179 B1 | 8/2001 | Kadono | |
| 6,289,049 B1 | 9/2001 | Kim et al. | |
| 6,359,929 B1 | 3/2002 | Boon | |
| 6,363,119 B1 | 3/2002 | Oami | |
| 6,381,277 B1 | 4/2002 | Chun et al. | |
| 6,462,791 B1 | 10/2002 | Zhu | |
| 6,735,249 B1 | 5/2004 | Karczewicz et al. | |
| 7,114,129 B2 | 9/2006 | Awada et al. | |
| 7,197,070 B1* | 3/2007 | Zhang et al. | 375/240.01 |
| 7,424,056 B2 | 9/2008 | Lin et al. | |
| 2002/0003575 A1 | 1/2002 | Marchese | |
| 2002/0017565 A1 | 2/2002 | Ju et al. | |
| 2002/0031272 A1 | 3/2002 | Bagni et al. | |
| 2003/0012281 A1 | 1/2003 | Cho et al. | |
| 2003/0053544 A1 | 3/2003 | Yasunari et al. | |
| 2003/0215135 A1 | 11/2003 | Caron et al. | |
| 2004/0001634 A1 | 1/2004 | Mehrotra | |
| 2004/0017939 A1 | 1/2004 | Mehrotra | |
| 2004/0196902 A1 | 10/2004 | Faroudja | |
| 2004/0252886 A1 | 12/2004 | Pan et al. | |
| 2005/0185715 A1 | 8/2005 | Karczewicz et al. | |
| 2005/0238243 A1 | 10/2005 | Kondo et al. | |
| 2005/0259729 A1 | 11/2005 | Sun | |
| 2005/0271140 A1 | 12/2005 | Hanamura et al. | |
| 2006/0008038 A1* | 1/2006 | Song et al. | 375/350 |
| 2006/0039470 A1 | 2/2006 | Kim et al. | |
| 2006/0056689 A1 | 3/2006 | Wittebrood et al. | |
| 2006/0176316 A1 | 8/2006 | Nagasaki et al. | |
| 2006/0245499 A1 | 11/2006 | Chiu et al. | |
| 2007/0036354 A1 | 2/2007 | Wee et al. | |
| 2007/0065026 A1 | 3/2007 | Lee et al. | |
| 2007/0080971 A1 | 4/2007 | Sung | |
| 2007/0121100 A1 | 5/2007 | Divo | |
| 2007/0216777 A1 | 9/2007 | Quan et al. | |
| 2007/0217701 A1 | 9/2007 | Liu et al. | |
| 2008/0069440 A1 | 3/2008 | Forutanpour | |
| 2008/0239354 A1 | 10/2008 | Usui | |
| 2008/0260042 A1* | 10/2008 | Shah et al. | 375/240.25 |
| 2009/0080523 A1 | 3/2009 | McDowell | |
| 2009/0122867 A1 | 5/2009 | Mauchly et al. | |
| 2009/0161763 A1 | 6/2009 | Rossignol et al. | |
| 2009/0232401 A1 | 9/2009 | Yamashita et al. | |
| 2009/0237728 A1 | 9/2009 | Yamamoto | |
| 2009/0238277 A1 | 9/2009 | Meehan | |
| 2009/0307428 A1 | 12/2009 | Schmieder et al. | |
| 2010/0021009 A1 | 1/2010 | Yao | |
| 2010/0026608 A1 | 2/2010 | Adams et al. | |
| 2010/0034268 A1 | 2/2010 | Kusakabe et al. | |
| 2010/0104021 A1 | 4/2010 | Schmit | |
| 2010/0235583 A1 | 9/2010 | Gokaraju et al. | |
| 2011/0002541 A1 | 1/2011 | Varekamp | |
| 2011/0010629 A1 | 1/2011 | Castro et al. | |
| 2011/0026591 A1 | 2/2011 | Bauza et al. | |
| 2011/0033125 A1 | 2/2011 | Shiraishi | |
| 2011/0069890 A1 | 3/2011 | Besley | |
| 2011/0158529 A1 | 6/2011 | Malik | |
| 2011/0219331 A1 | 9/2011 | DeLuca et al. | |
| 2011/0255592 A1 | 10/2011 | Sung et al. | |
| 2011/0268359 A1 | 11/2011 | Steinberg et al. | |
| 2012/0020408 A1 | 1/2012 | Chen et al. | |
| 2012/0213280 A1 | 8/2012 | Srinivasan et al. | |
| 2012/0278433 A1 | 11/2012 | Liu et al. | |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Office Action mailed May 30, 2013 in co-pending U.S. Appl. No. 13/089,383, filed Apr. 19, 2011.
Office Action mailed May 22, 2013 in co-pending U.S. Appl. No. 13/095,975, filed Apr. 28, 2011.
Nokia, Inc., Nokia Research Center, "MVC Decoder Description", Telecommunication Standardization Sector, Study Period 1997-2000, Geneva, Feb. 7, 2000, 99 pp.
Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Chen, Xing C., et al.; "Quadtree Based Adaptive Lossy Coding of Motion Vectors", IEEE 1996, 4 pp.
Wright, R. Glenn, et al.; "Multimedia—Electronic Technical Manual for ATE", IEEE 1996, 3 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Strobach, Peter; "Tree-Structured Scene Adaptive Coder", IEEE Transactions on Communications, vol. 38, No. 4, Apr. 1990, 10 pp.
Steliaros, Michael K., et al.; "Locally-accurate motion estimation for object-based video coding", SPIE vol. 3309, 1997, 11 pp.
Martin, Graham R., et al.; "Reduced Entropy Motion Compensation Using Variable Sized Blocks", SPIE vol. 3024, 1997, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Guillotel, Philippe, et al.; "Comparison of motion vector coding techniques", SPIE vol. 2308, 1994, 11 pp.
Orchard, Michael T.; "Exploiting Scene Structure in Video Coding", IEEE 1991, 5 pp.
Liu, Bede, et al.; "A simple method to segment motion field for video coding", SPIE vol. 1818, Visual Communications and Image Processing 1992, 10 pp.

(56) References Cited

OTHER PUBLICATIONS

Ebrahimi, Touradj, et al.; "Joint motion estimation and segmentation for very low bitrate video coding", SPIE vol. 2501, 1995, 12 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Office Action Mailed Jun. 5, 2013 in co-pending U.S. Appl. No. 13/095,971, filed Apr. 28, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Notice of Allowance in related matter U.S. Appl. No. 13/095,975 mailed Jan. 29, 2014.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

\* cited by examiner

METHOD AND APPARATUS FOR ENCODING VIDEO WITH DYNAMIC QUALITY IMPROVEMENT

TECHNICAL FIELD

The present invention relates in general to video encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use quantization and transform techniques on the frames of a digital video stream to reduce the bitrate (i.e. encoded data size) of the encoded digital video stream. Such techniques are lossy in nature—meaning that part of the original digital video stream is lost during encoding. Quantization techniques are used to discard part of a frame's data based on standard computations, thereby reducing the frame's bitrate. Quantization is a low-pass technique, which can cause blurring or other effects on a frame. These effects result in video artifacts around the edges in the frame's contents, such as ring artifacts. These artifacts are especially noticeable in digital video streams containing numerous edges, such as in screen capture and screen casting applications.

SUMMARY

Methods and apparatuses are disclosed for encoding video with dynamic quality improvement. In accordance with one aspect of the disclosed embodiments a method is provided for encoding a video signal having a sequence of frames including a reference frame and a current frame. The method includes encoding at a least a portion of the reference frame using a low-quality encoding scheme and encoding the current frame using the reference frame so that the encoded current frame includes at least one pixel encoded using the low-quality encoding scheme. The method also includes identifying a portion of the encoded current frame that includes at least one pixel encoded using the low-quality encoding scheme. The method also includes encoding the identified portion of the current frame using a high-quality encoding scheme.

In accordance with another aspect of the disclosed embodiments, an apparatus is provided for encoding a video signal having a sequence of frames including a reference frame and a current frame. The apparatus includes means for encoding at a least a portion of the reference frame using a low-quality encoding scheme and means for encoding the current frame using the reference frame so that the encoded current frame includes at least one pixel encoded using the low-quality encoding scheme. The apparatus also includes means for identifying a portion of the encoded current frame that includes at least one pixel encoded using the low-quality encoding scheme. The apparatus also includes means for encoding the identified portion of the current frame using a high-quality encoding scheme.

In accordance with another aspect of the disclosed embodiments, an apparatus is provided for encoding a video signal having a sequence of frames including a reference frame and a current frame. The apparatus includes a memory and a processor used to encode a video signal. The processor is configured to execute instructions stored in the memory to (1) encode at a least a portion of the reference frame using a low-quality encoding scheme, (2) encode the current frame using the reference frame so that the encoded current frame includes at least one pixel encoded using the low-quality encoding scheme, (3) identify a portion of the encoded current frame that includes at least one pixel encoded using the low-quality encoding scheme, and (4) encode the identified portion of the current frame using a high-quality encoding scheme.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

This Application hereby incorporates by reference in the entirety the following: co-pending U.S. patent application Ser. No. 13/089,383 filed on Apr. 19, 2011 and entitled "METHOD AND APPARATUS FOR ENCODING VIDEO USING DATA FREQUENCY", co-pending U.S. patent application Ser. No. 13/095,975 filed on Apr. 28, 2011 and entitled "METHOD AND APPARATUS FOR ENCODING ANCHOR FRAME", and co-pending U.S. patent application Ser. No. 13/095,974 filed on Apr. 28, 2011 and entitled "METHOD AND APPARATUS FOR ENCODING VIDEO USING MATCHING REGIONS".

Figure 1:
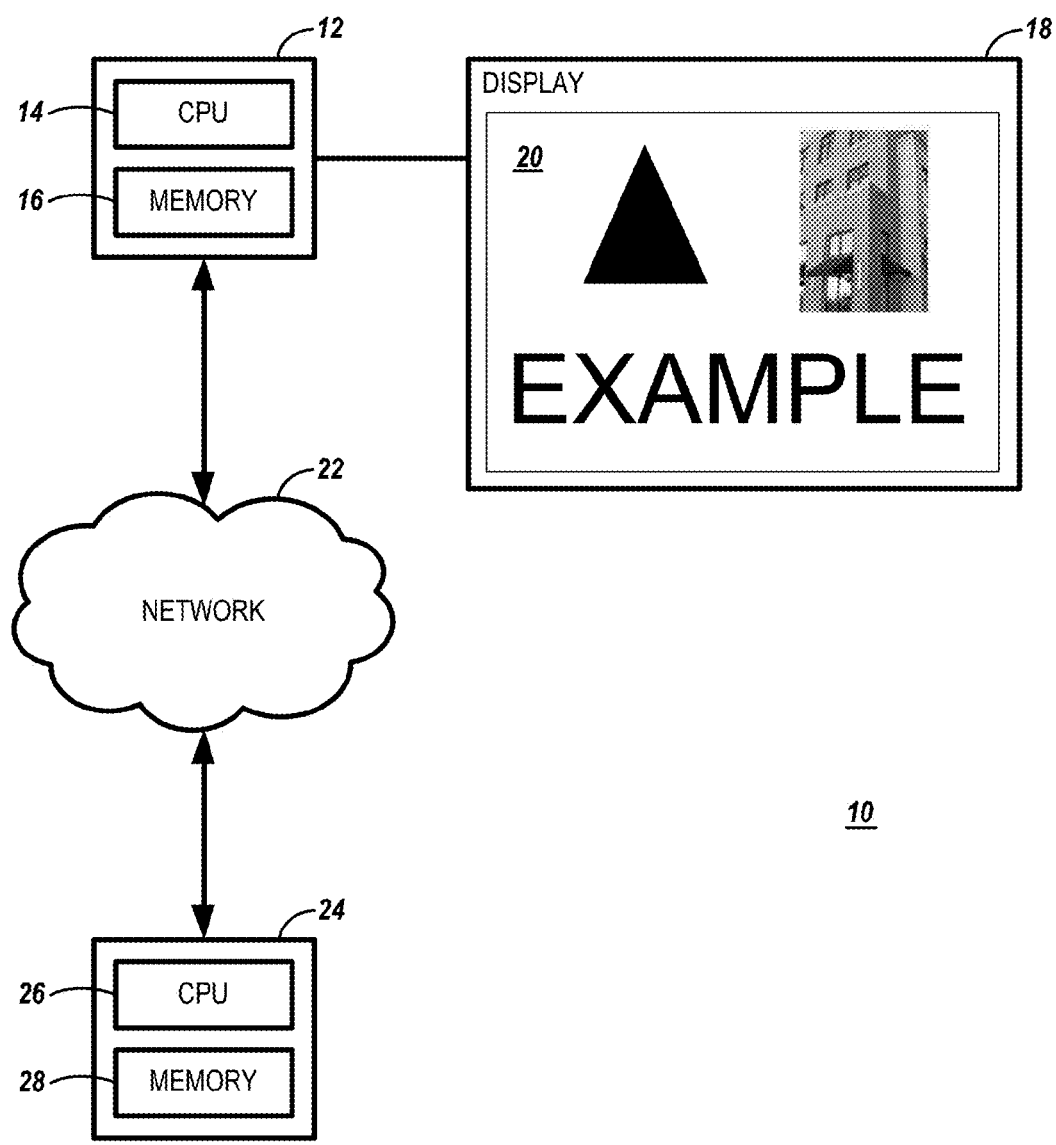
FIG. 1 is a diagram of an encoder and decoder system in accordance with one embodiment.

FIG. 1 is a diagram of an encoder and decoder system 10 for digital video streams. An exemplary transmitting station 12 may be, for example, a computer having an internal configuration of hardware including a central processing unit (CPU) 14 and memory 16. The CPU 14 is a controller for controlling the operations of transmitting station 12. The CPU 14 is connected to memory 16 by, for example, a memory bus. The memory 16 may be random access memory (RAM). The memory 16 stores data and program instructions which are used by the CPU 14. Other suitable implementations of transmitting station 12 are possible such as those explained later.

A display 18 configured to display video output can be connected to transmitting station 12. The display 18 can be implemented in various ways, including by a liquid crystal display (LCD) or a cathode-ray tube (CRT). The display 18 can also be configured for other uses, such as screen casting or screen capture. The display 18 can display, fore example, a frame 20 of a digital video stream.

The frame 20 may include output from the graphical user interface (GUI) of the transmitting station 12. It may include, for example, visual elements such as a taskbar, one or more application windows, and a desktop background. The application windows, for example, may include text, images, or other graphics that may be scrolled within the application windows. However, the frame 20 may include any sequence of video frames containing any type of image, including movies, video clips, or still images.

A network 22 connects the transmitting station 12 and a receiving station 24. The network 22 may, for example, be what is commonly known as the Internet. The network 22 may also be a local area network (LAN), wide area network (WAN), virtual private network (VPN), or any other means of transferring data between transmitting station 12 and receiving station 24.

The exemplary receiving station 24 may be a computer having an internal configuration of hardware include a central processing unit (CPU) 26 and a memory 28. The CPU 26 is a controller for controlling the operations of transmitting station 12. The CPU 26 is connected to memory 28 by, for example, a memory bus. The memory 28 may be random access memory (RAM). The memory 28 stores data and program instructions which are used by the CPU 26. Other suitable implementations of receiving station 24 are possible such as those explained later.

Figure 2:
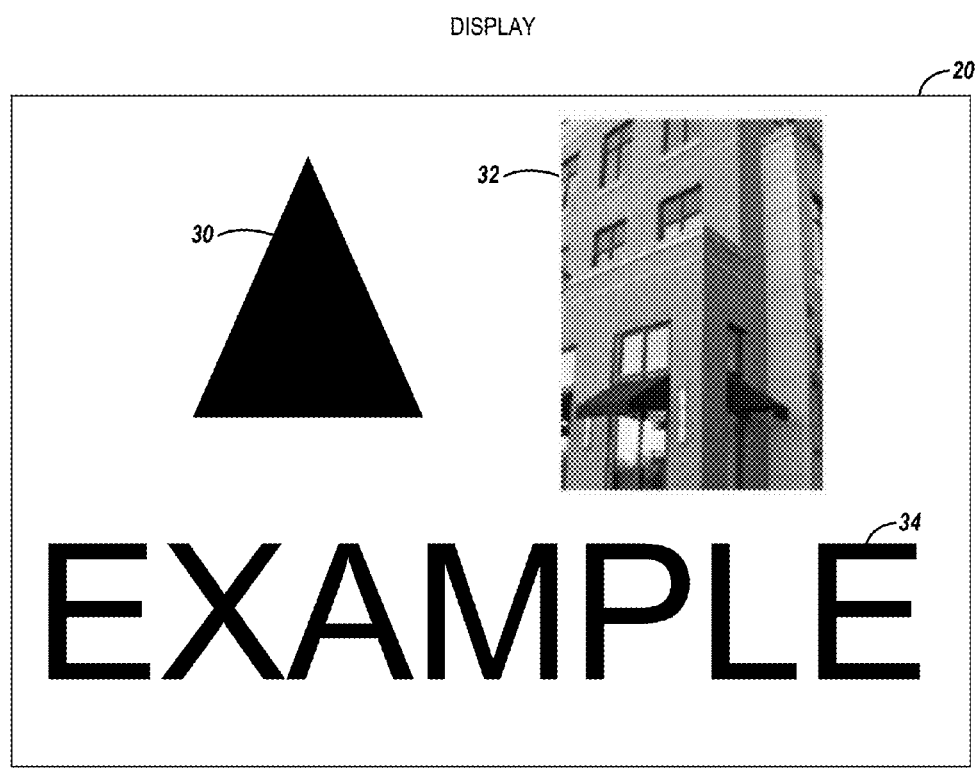
FIG. 2 is an exemplary frame of a digital video stream in the system of FIG. 1.

FIG. 2 is an exemplary frame 20 of the digital video stream as shown in FIG. 1. In the example shown, the frame 20 has geometrical 30, image 32, and text 34 components. Each component has specific characteristics. For example, the geometrical component 30 has pixels that are the same color. Each line of pixels that includes a part of the geometrical component 30 may contain a different number of pixels of the geometrical component 30. For example, the top of geometrical component 30 may only have one pixel in a line of pixels, whereas the bottom of geometrical component 30 may have hundreds of pixels in a line of pixels.

With respect to the image 32, it contains varying colors that together depict a building. With respect to the text 34, the majority of the pixels in each letter of text 34 has the same exact color (black). However, for example, text 34 may be anti-aliased. In such a case, the edges of text 34 will be blurred and the pixels at the edges of text 34 will be various shades of color between the text (black) and the background (white).

The frame 20 and its contents have been chosen purely for explanatory purposes. Practical applications of the methods herein are applicable to digital video streams that may be much more complex than frame 20, and may contain frames that have aspects similar to or different than one or more of the aspects of the frame 20. For example, a frame could include a taskbar and application window(s) that are represented using geometrical shapes, images, text, and combinations or variations thereof.

Figure 3:
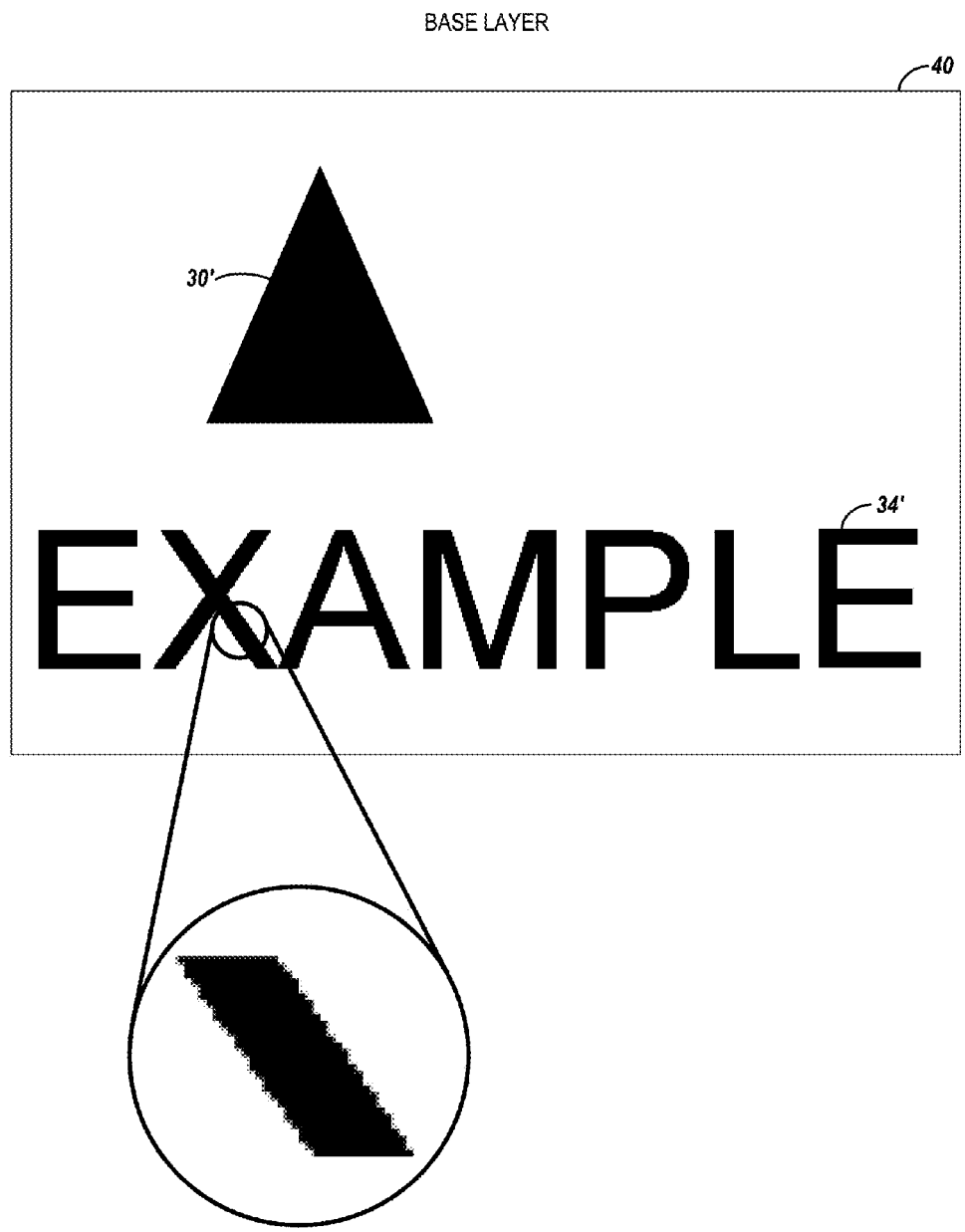
FIG. 3 is the base layer portion of the frame of FIG. 2.
Figure 4:
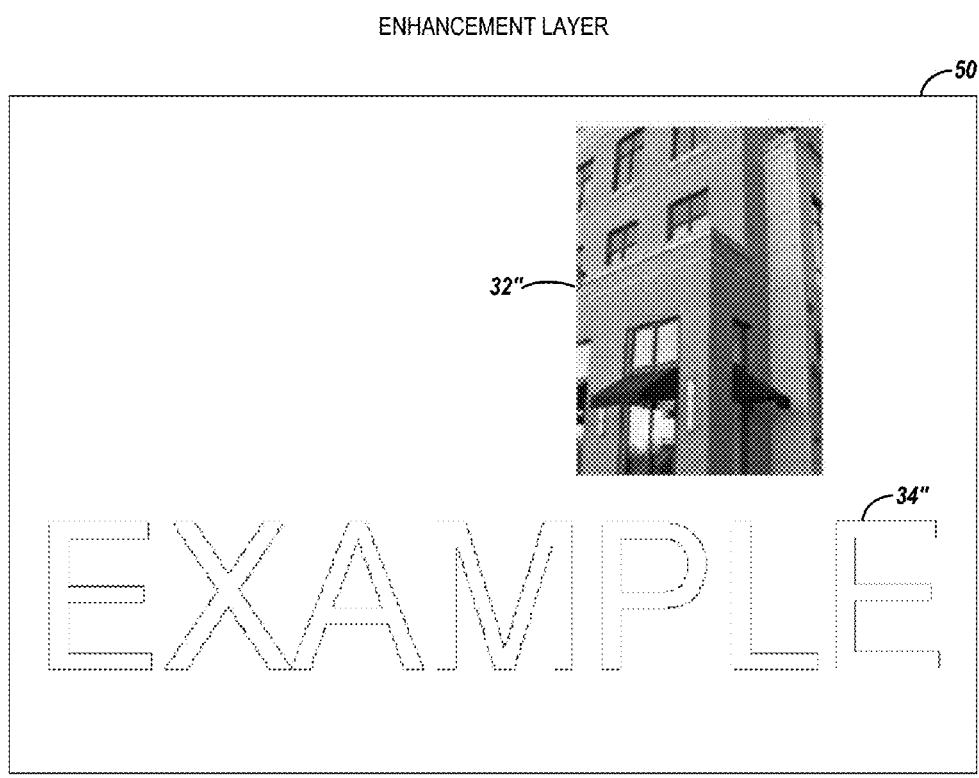
FIG. 4 is the enhancement layer portion of the frame of FIG. 2.

FIG. 3 is the base layer portion 40 of the exemplary frame 20 of FIG. 2 and FIG. 4 is the enhancement layer portion 50 of the exemplary frame 20 of FIG. 2. With respect to both figures, the exemplary frame 20 can be divided into a base layer portion 40 and an enhancement layer portion 50. The layers distinguish between high-frequency and low-frequency portions of the frame. The base layer portion is primarily composed of low frequency data, whereas the enhancement layer portion is primarily composed of high frequency data. In this context, frequency refers to the rate of change of the value of pixels in the frame. For example, with respect to the base layer portion 40, the geometrical component 30', non anti-aliased text 34' and white background could be considered as low frequency portions. Both have a very low rate of change in pixel values and each have substantially identical pixel values.

The determination of whether a pixel is substantially identical can vary from implementation to implementation. The basic determination is whether or not the color value of spatially correspondent pixels in the reference frame and the non-anchor frame are exactly the same. However, in some instances, it may be preferable to include pixels in the static content area with substantially similar color value(s), for example, within a threshold. In this instance, the decoded version of the non-anchor frame would reference the color value of the pixel from the reference frame, even though it may be different than the color value of the pixel actually in the non-anchor frame.

In addition, a pixel may be substantially identical even if it is not very similar. An implementation may include a process for despeckling the static content area. For example, the process may determine that a pixel in the non-anchor frame is an error or an aberration in the non-anchor frame and may include that pixel in the static content area even though it is not similar to the spatially correspondent pixel in the reference frame. Also, a portion of pixels in a frame may be substantially identical to another portion if a majority of the pixels in the portions are substantially identical.

To contrast, with respect to enhancement layer portion 50, image 32' is an example of a high frequency portion, with variations in pixel values over small areas of the frame. Also, anti-aliased text 34" could be included in the enhancement layer portion 50 because of the variation in pixel values from black to white over a very small area.

Dividing the frame into enhancement and base layers allow for application of encoding schemes that are situated for the characteristics of each layer. The base layer will typically include background areas and edges within a frame. Typically, the base layer would encompass GUI elements on a computer screen, such as the taskbar, application windows, or a constant color background. However, other types of video data can be included in the base layer, such as is found in presentation slideshows and line drawings or animated versions thereof.

The base layer can be encoded using a high-quality encoding scheme, which can be, for example, a lossless encoding scheme. Alternatively, the high-quality encoding scheme can be a lossy encoding scheme that does not result in a significant data loss. The high-quality encoding scheme can provide a better decoded digital video signal for the base layer by eliminating or greatly reducing the encoding artifacts that can be introduced using other techniques. The high quality encoding scheme can be implemented with high levels of compression with zero or little loss because the base layer is more repetitive in nature.

The enhancement layer can be encoded using standard video or image encoding techniques, including lossy encoding schemes. Such techniques can include a high-quality encoding scheme or a low-quality encoding scheme (i.e. having a greater degree of loss than the high-quality encoding scheme). The low-quality encoding scheme, while resulting in greater data loss, can be less noticeable to the end user when applied to the enhancement layer only, as opposed to being applied to the entire frame (including the base layer). This is because the data in the enhancement layer, being of primarily high frequency data, is more susceptible to standard encoding techniques at higher quantization levels than the data in the base layer. Encoding techniques that can be used include MJPEG, H.264, and VP8 encoding standards. Although any still or video image encoding technique may be used.

An anchor frame is a frame that is encoded with reference to no other frames. A non-anchor frame is a frame that is encoded with reference to a previously encoded frame. In one implementation, the non-anchor frame refers to the frame immediately preceding the current frame. The encoder can determine that the current frame is an anchor frame using a number of different methodologies. For example, the current frame can be an anchor frame based upon the position of the current frame in the video data stream. If, for example, the current frame is the first frame in the video data stream, the current frame will be an anchor frame.

The current frame can also become an anchor frame if it is requested by the receiving station 24. For example, the receiving station 24 might detect an error in a sequence of encoded non-anchor frames. In order to recover from the error, the receiving station 24 can request that the next frame be an anchor frame. More sophisticated methods of determining whether to use the current frame as an anchor frame can also be used. For example, the current frame may be deemed an anchor frame if the difference between the current frame and the immediately preceding frame is large. Or the encoder can strategically determine points in time to insert an anchor frame to prevent error propagation.

The system of encoding and decoding using base and enhancement layers is further described in a contemporaneously filed US Patent Application entitled "System and Method for Encoding Video Using Frequency-Based Layers," assigned to Google, Inc. and incorporated herein by reference.

Non-anchor frames can be encoded with a static area and one or more matching portions (reference portions) referencing a reference frame. Any remainder portion of the non-anchor frame can be encoded using another encoding scheme, such as the base and enhancement layer scheme used for anchor frames. The static content area can be found by way of a delta (difference) operation between the non-anchor frame and its reference frame. Pixels that are substantially identical between the two frames will be included in the static content area.

Figure 5:
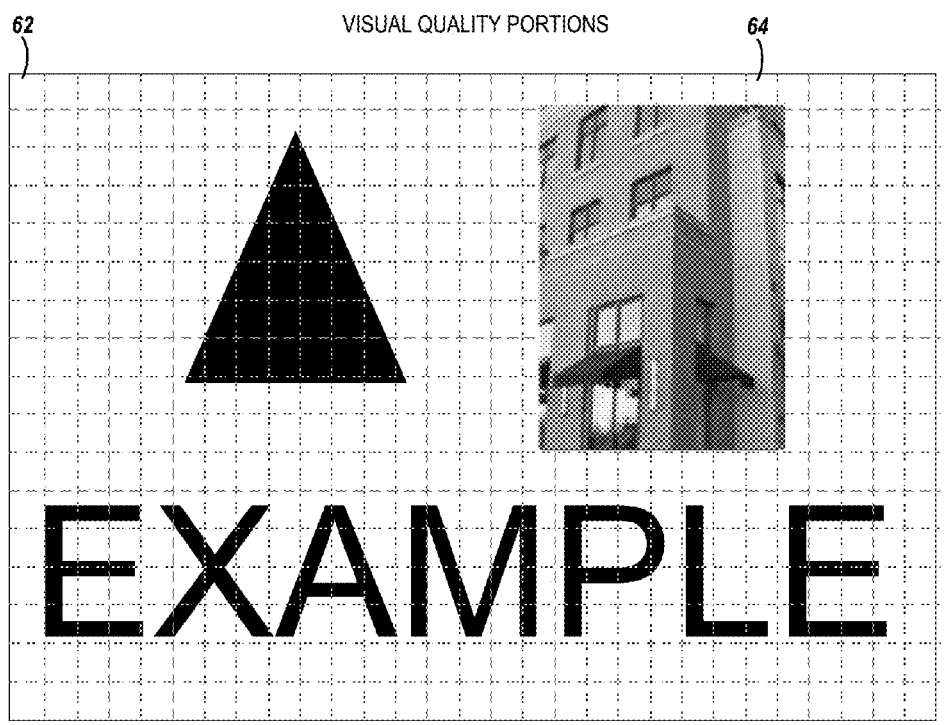
FIG. 5 is a frame of the digital video stream of FIG. 1 subdivided into visual quality portions.

FIG. 5 is a frame 60 of the digital video stream of FIG. 1 subdivided into visual quality portions. Portions can also be referred to as patches. Exemplary portions include portion 62 and portion 64. The portions are defined in this example using grey dotted lines. Each portion can be, for example, 128 pixels high and 128 pixels wide. However, any portion size can be used. The portion size may be a fixed size known to both the encoder and the decoder, or the portion size may be set by one of the encoder or decoder and transmitted to the other of the encoder or decoder.

Each portion can be a high-quality or a low-quality portion. The type of portion can be stored using a portion map. The portion map can be a matrix of bits, for example, where a portion's bit is 1 if it is low-quality and 0 if it is high-quality. The type of portion is determined based on the encoding scheme used to encode the pixels in the portion, as described in more detail with respect to FIG. 6.

Figure 6:
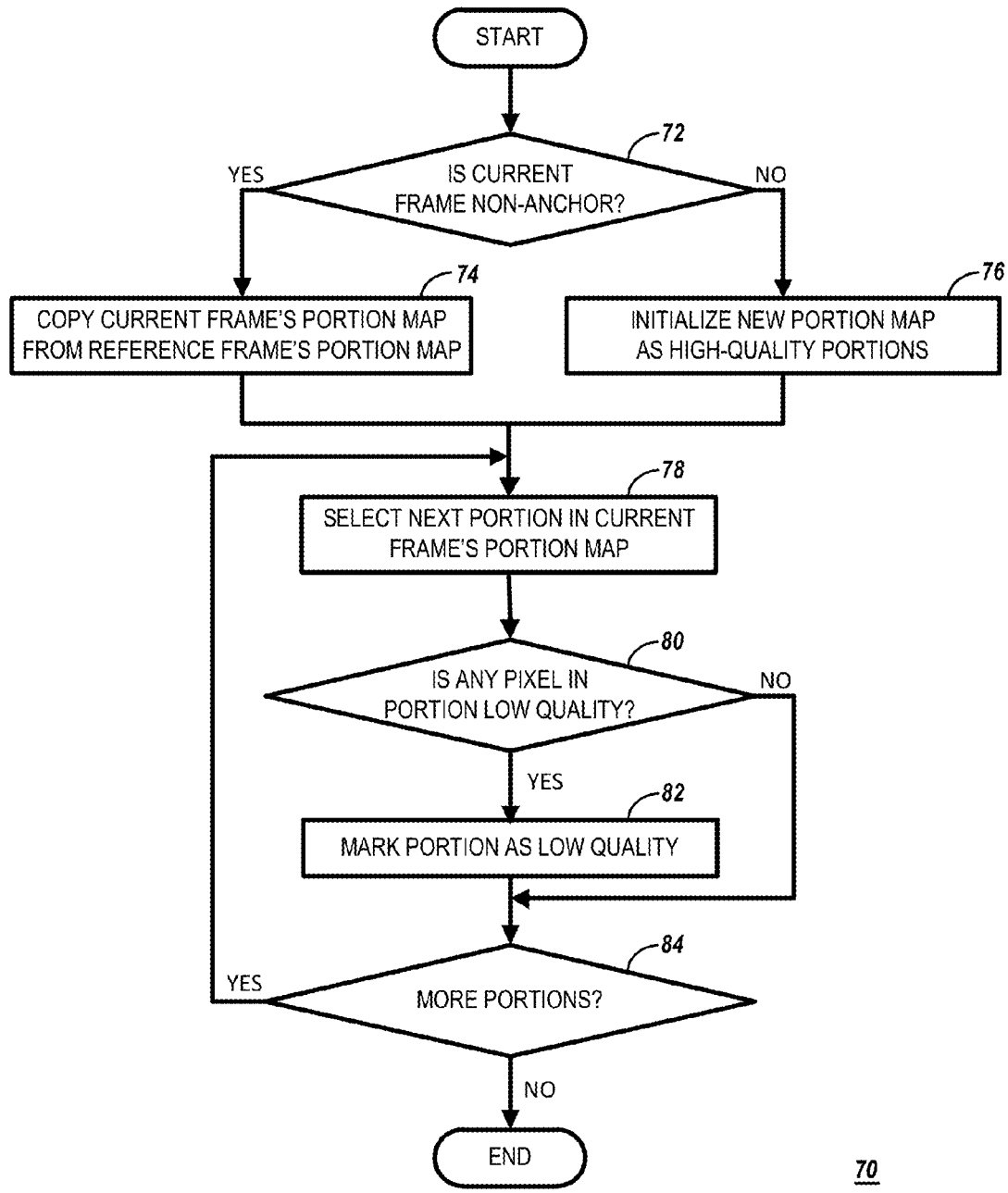
FIG. 6 is a flowchart of a method to determine the quality of each visual quality portion of a current frame.

FIG. 6 is a flowchart of a method 70 to determine the quality of each visual quality portion of a current frame. This method 70 can be performed after the current frame is encoded by the encoder. First, the type of frame is determined by the encoder (72). If the current frame is a non-anchor frame, the portion map for the current frame is created by copying the portion map from the current frame's reference frame (74). However, if the current frame is an anchor frame, its portion map is initialized as containing all high-quality portions (76).

Once the portion map for the current frame is initialized, each portion is examined to see if its type needs to be updated. First, the next available portion in the portion map is selected (78). Then, the encoder determines if there exists any pixel in the portion that was encoded using a low-quality encoding scheme (80). The encoder can, as a threshold matter, check the current frame for any pixels in the portion that are not in the static or matching areas that reference the reference frame. If those pixels were in the enhancement layer, and the enhancement layer of the current frame was encoded using a low-quality encoding scheme, then the current portion would be marked as low quality.

While a pixel in the base layer would generally not be encoded using a low-quality encoding scheme—an implementation could also check base layer pixels in the portion to see if those were encoded using a low-quality encoding scheme. Also, this method is not limited only to implementations with base and enhancement layers. This method could also be used with other encoding schemes that have at least two encoding schemes of differing quality.

If no low-quality pixels are found in the current frame, the encoder next examines the pixels in the static and matching areas for a previously encoded low-quality pixel encoded using a low-quality encoding scheme. In one implementation, the quality of these pixels will be determined based on the portion in the reference frame that each pixel references. This implementation allows for determination of the encoding scheme of the pixels by only referencing the reference frame. An alternative implementation could iteratively reference back through multiple reference frames until the frame in which the target pixel was originally encoded in. While such a implementation will have a marginal increase in accuracy of determining whether a pixel was encoded using a low-quality scheme, it would be computationally expensive.

If any pixel in the portion is found to be encoded using a low-quality scheme, the portion is marked as low-quality in the portion map (82). Otherwise, or after the portion is marked low-quality, the encoder determines whether there are additional portions (84). If there are additional portions, control returns to stage 78 where the next portion will be selected. Otherwise, method 70 completes.

Figure 7:
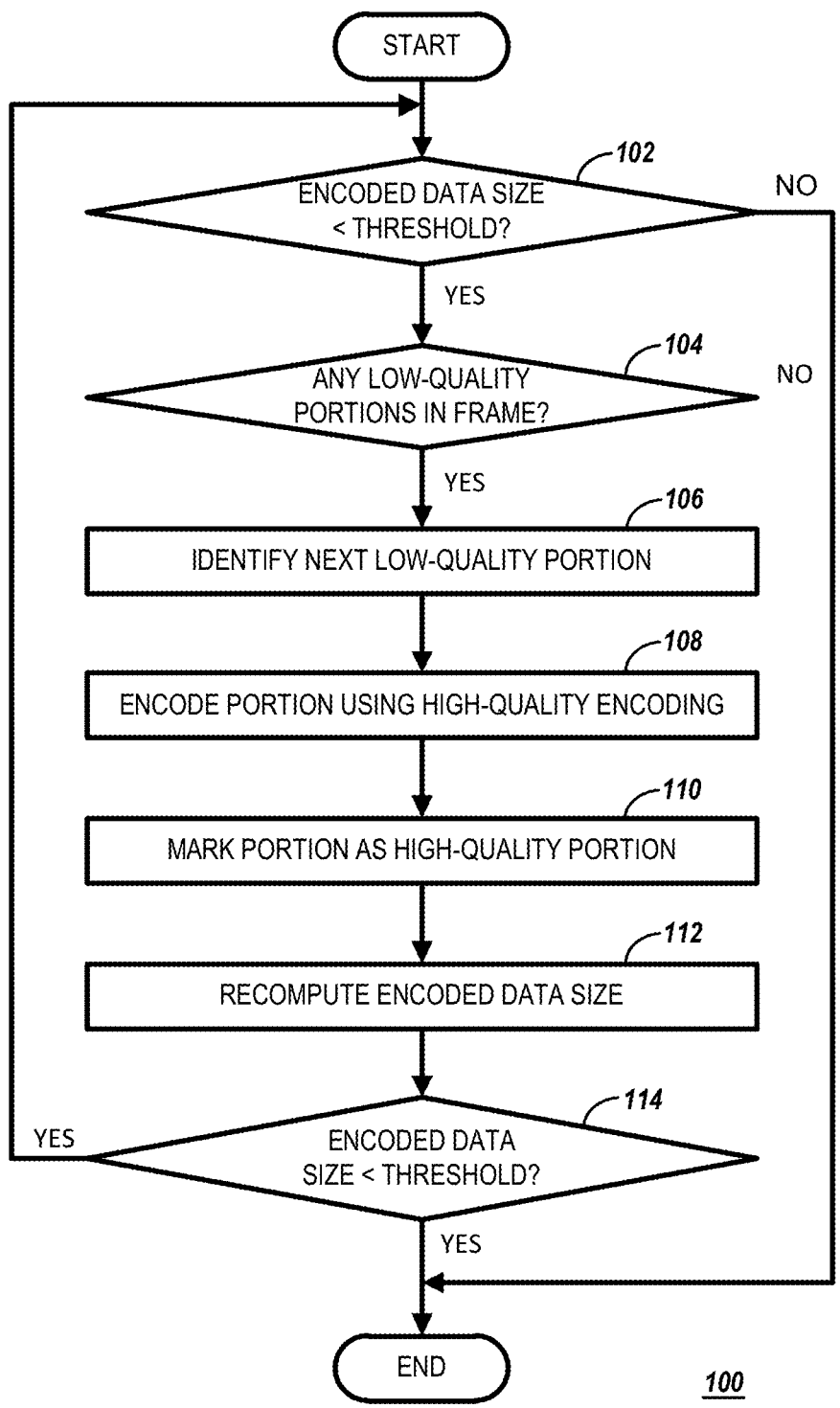
FIG. 7 is a flowchart of a method to encode lower quality portions using a high-quality encoding scheme.

FIG. 7 is a flowchart of a method 100 to encode low-quality portions using a high-quality encoding scheme. The method 100 is dependant on two input parameters. The first parameter is the encoded data size of the current frame (the frame's "bitrate"). The other parameter is the bandwidth available for transmitting the encoded current frame of the encoded digital video stream (the "available bitrate"). The available bitrate is used to calculate a bitrate threshold by the encoder. The bitrate threshold can be the same as the available bitrate, or it may be smaller than the available bitrate to reserve bandwidth.

Once the encoded data size and bitrate threshold are determined, the encoder compares them (102). If the current frame bitrate is greater than the bitrate threshold, the method 100 ends, and the visual quality is not dynamically improved for this current frame. Otherwise, the encoder continues to determine whether there are any low-quality portions in the current frame (as determined by method 70 in FIG. 6) (104). If there are no low-quality portions in the frame, then the visual quality cannot be improved for the current frame and the method 100 ends.

However, if there are low-quality portions in the frame, the encoder identifies the next low-quality portion (106). The encoder can identify the first low-quality portion in raster order. But alternatively, the encoder can identify the first low-quality portion using some other identification methodology.

The encoder re-encodes the identified portion's pixels using a high-quality encoding scheme (108). The re-encoded patch can be appended to the end of the encoded current portion. In this case, the decoder would decode the current frame, and then supplement the decoded current frame with the decoded portion(s) at the end of the encoded current frame.

Alternatively, the re-encoded portion(s) could be incorporated into the encoding of the current frame. For example, the current frame could be completely re-encoded while forcing the identified portion to be encoded using a high-quality encoding scheme. In this case, the re-encoding of the current frame could take place after multiple portions were identified. Or, the identified portion could be encoded using the high-quality encoding scheme, and the encoded portion could directly replace that portion of the encoded current frame, if the encoding schemes used would permit such an operation.

Once the identified portion is re-encoded, it is marked as a high-quality portion in the portion map (110). The bitrate of the current frame and encoded portion(s) is recalculated (112). Then, the encoder compares the new bitrate to the bitrate threshold (114). If the new bitrate is still less than the bitrate threshold, control returns to stage 104 to encode additional low-quality portions using a high-quality encoding scheme if available. However, if the bitrate now exceeds the bitrate threshold, the method 100 completes.

The operation of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 24 (and the algorithms, methods, instructions etc. stored thereon and/or executed thereby) can be realized in hardware, software, or any combination thereof including, for example, IP cores, ASICS, programmable logic arrays, optical processors, quantum or molecular processors, programmable logic controllers, microcode, firmware, microcontrollers, servers, microprocessors, digital signal processors or any other suitable circuit. In the claims, the term "processor" should be understood as encompassing any the foregoing devices, either singly or in combination. The terms "signal" and "data" are used interchangeably.

Further, portions of transmitting station 12 and receiving station 24 do not necessarily have to be implemented in the same manner. Thus, for example, some portions can be implemented in software and others in hardware. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 24 can be implemented in whole or in part by one or more computers, servers, processors or any other suitable computing device or system that can carry out any of the embodiments described herein. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

Transmitting station 12 and receiving station 24 can, for example, be implemented on computers in a screen casting system. Alternatively, transmitting station 12 can be implemented on a server and receiving station 24 can be implemented on a device separate from the server, such as a hand-held communications device (i.e. a cell phone). In this instance, transmitting station 12 can encode content and transmit an encoded video signal to the communications device. In turn, the communications device can then decode an encoded video signal. Alternatively, the communications device can decode content stored locally on the communications device (i.e. no transmission is necessary). Other suitable transmitting station 12 and receiving station 24 implementation schemes are available. For example, receiving station 24 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a sequence of frames including a reference frame and a current frame, the method comprising:

encoding at a least a portion of the reference frame using a first encoding scheme, wherein the first encoding scheme is a lossy encoding scheme;

encoding the current frame, wherein at least a portion of the current frame is encoded using the portion of the reference frame so that the encoded current frame includes at least one pixel encoded using the first encoding scheme;

determining, subsequent to encoding the current frame, that a current frame bitrate for the encoded current frame is less than a bitrate threshold; and performing, while the current frame bitrate is less than the bitrate threshold, one or more iterations of a quality improvement operation that includes:

identifying a portion of the encoded current frame that includes at least one pixel encoded using the first encoding scheme based on a comparison of a current frame bitrate and a bitrate threshold, encoding the identified portion of the current frame using a second encoding scheme, wherein the second encoding scheme is a lossless encoding scheme, and updating the current frame bitrate for the encoded current frame.

2. The method of claim 1, wherein the bitrate threshold is based on a bandwidth available for transmitting the encoded current frame.

3. The method of claim 1, wherein identifying the identified portion of the current frame that includes at least one pixel encoded using the first encoding scheme comprises:

dividing the current frame into a first set of visual quality portions;

identifying a visual quality portion of the first set of visual quality portions as a low-quality or high-quality visual quality portion based on whether there is at least one pixel encoded using the first encoding scheme in the visual quality portion; and selecting the identified portion of the current frame as one of the low-quality visual quality portions identified in the first set of visual quality portions.

4. The method of claim 3, wherein identifying the identified portion of the current frame that includes at least one pixel encoded using the first encoding scheme further comprises:

identifying a visual quality portion as low-quality if any pixel in the visual quality portion was encoded by referencing a previously encoded pixel encoded using the first encoding scheme.

5. The method of claim 1, wherein encoding the current frame comprises:

encoding a reference portion of the current frame by referencing pixels in the reference frame; and encoding a remainder portion of the current frame using an encoding scheme.

6. The method of claim 1, further comprising:

identifying an identified portion of the reference frame that includes at least one pixel encoded using the first encoding scheme; and identifying an identified portion of the current frame that includes at least one pixel encoded using the first encoding scheme using the identified portion of the reference frame.

7. The method of claim 1, wherein encoding the identified portion of the current frame using a second encoding scheme comprises:

appending the encoded identified portion of the current frame to the encoded current frame.

8. The method of claim 1, wherein encoding the identified portion of the current frame using a second encoding scheme comprises:

re-encoding the current frame using the second encoding scheme for the identified portion of the current frame; and replacing the encoded current frame with the re-encoded current frame.

9. The method of claim 1 wherein the first encoding scheme is a low-quality encoding scheme having a greater degree of data loss than a high-quality encoding scheme.

10. The method of claim 1 wherein the second encoding scheme is a high-quality encoding scheme having a lesser degree of data loss than a low-quality encoding scheme.

11. An apparatus for encoding a video signal having a sequence of frames including a reference frame and a current frame, the apparatus comprising:

a memory; and a processor configured to execute instructions stored in the memory to:

encode at a least a portion of the reference frame using a first encoding scheme, wherein the first encoding scheme is a lossy encoding scheme;

encode the current frame, wherein at least a portion of the current frame is encoded using the portion of the reference frame so that the encoded current frame includes at least one pixel encoded using the first encoding scheme;

determine, subsequent to encoding the current frame, that a current frame bitrate for the current frame is less than a bitrate threshold; and perform, while the current frame bitrate is less than the bitrate threshold, one or more iterations of a quality improvement operation in which the instruction stored in the memory cause the processor to:

identify a portion of the encoded current frame that includes at least one pixel encoded using the first encoding scheme based on a comparison of a current frame bitrate and a bitrate threshold, encode the identified portion of the current frame using a second encoding scheme, wherein the second encoding scheme is a lossless encoding scheme, and update the current frame bitrate for the encoded current frame.

12. The apparatus of claim 11, wherein the bitrate threshold is based on a bandwidth available for transmitting the encoded current frame.

13. The apparatus of claim 11, wherein the processor's configuration to identify the identified portion of the current frame that includes at least one pixel encoded using the first encoding scheme comprises instructions to:

divide the current frame into a first set of visual quality portions;

encode a visual quality portion of the first set of visual quality portions as a low-quality or high-quality visual quality portion based on whether there is at least one pixel encoded using the first encoding scheme in the visual quality portion; and select the identified portion of the current frame as one of the low-quality visual quality portions identified in the first set of visual quality portions.

14. The apparatus of claim 13, wherein the processor's configuration to identify the identified portion of the current frame that includes at least one pixel encoded using the first encoding scheme further comprises instructions to:

encode a visual quality portion as low-quality if any pixel in the visual quality portion was encoded by referencing a previously encoded pixel encoded using the first encoding scheme.

15. The apparatus of claim 11, wherein the processor's configuration to encode the current frame comprises instructions to:

encode a reference portion of the current frame by referencing pixels in the reference frame; and encode a remainder portion of the current frame using an encoding scheme.

16. The apparatus of claim 11, wherein the processor is further configured to execute instructions stored in the memory to:
  identify an identified portion of the reference frame that includes at least one pixel encoded using the first encoding scheme; and
  identify an identified portion of the current frame that includes at least one pixel encoded using the first encoding scheme using the identified portion of the reference frame.

17. The apparatus of claim 11, wherein the processor's configuration to encode the identified portion of the current frame using a second encoding scheme comprises instructions to:
  append the encoded identified portion of the current frame to the encoded current frame.

18. The apparatus of claim 11, wherein the processor's configuration to encode the identified portion of the current frame using a second encoding scheme comprises instructions to:
  re-encode the current frame using the second encoding scheme for the identified portion of the current frame; and
  replace the encoded current frame with the re-encoded current frame.

19. A method for encoding a video signal having a sequence of frames including a current frame that is divided into a plurality of visual quality portions, the method comprising:

storing information in a portion map that identifies one or more of the visual quality portions of the current frame as low quality portions, the portion map including a single data value for each of the visual quality portions, the single data value being one of a first value that designates a respective visual quality portion as a low quality portion or a second value that designates the respective visual quality portion as a high quality portion;

encoding the current frame, wherein the low quality portions are encoded using a first encoding scheme;

determining, subsequent to encoding the current frame, that a current frame bitrate for the encoded current frame is less than a bitrate threshold; and performing, while the current frame bitrate is less than the bitrate threshold, one or more iterations of a quality improvement operation that includes:
  identifying one of the visual quality portions of the current frame by using the portion map to select one of the low quality portions,
  encoding the identified visual quality portion of the current frame as a high quality portion using a second encoding scheme that has a lesser degree of data loss than the first encoding scheme,
  updating the portion map to indicate that the identified visual quality portion is a high quality portion, and
  updating the current frame bitrate for the encoded current frame.

\* \* \* \* \*